Patented Jan. 13, 1925.

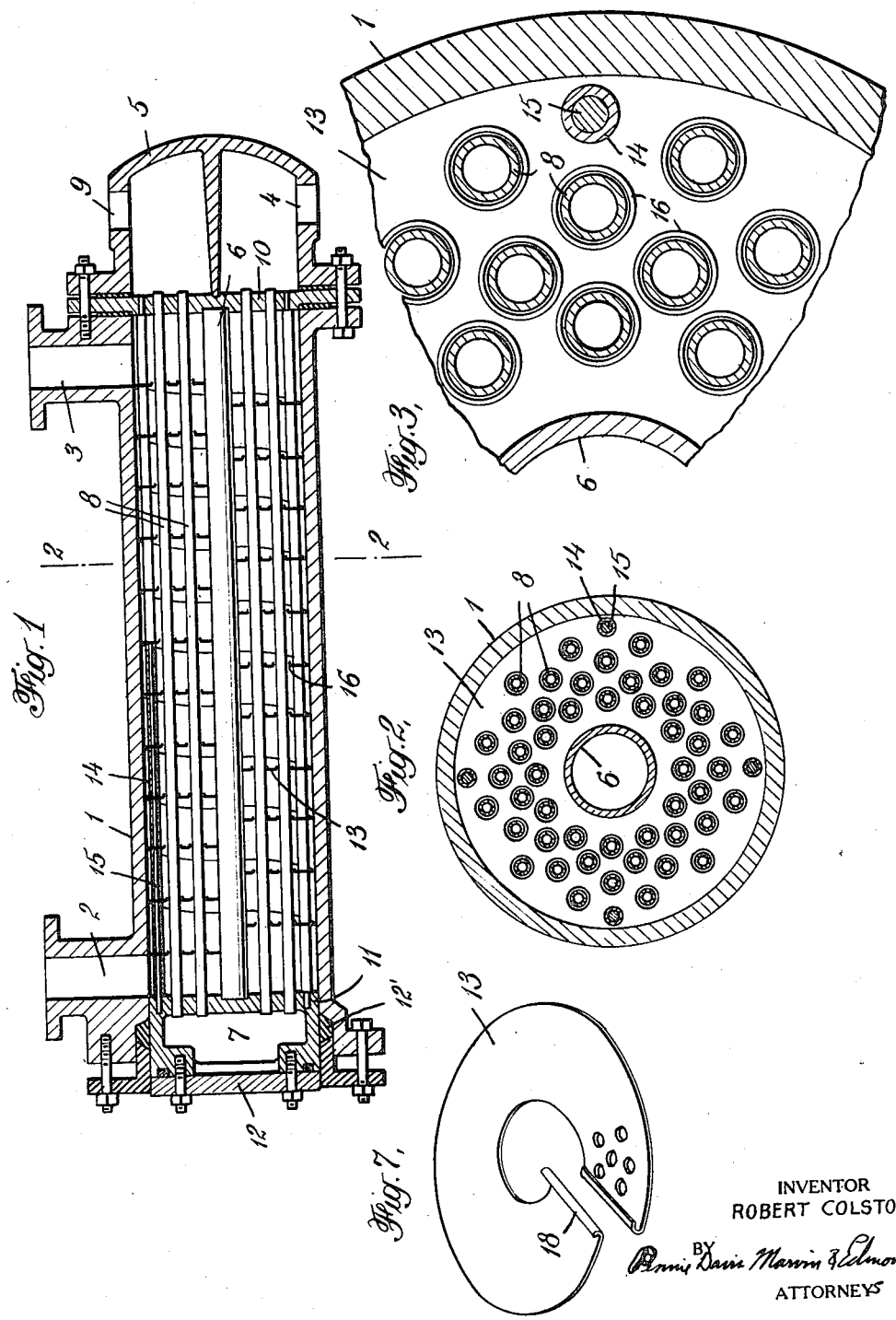

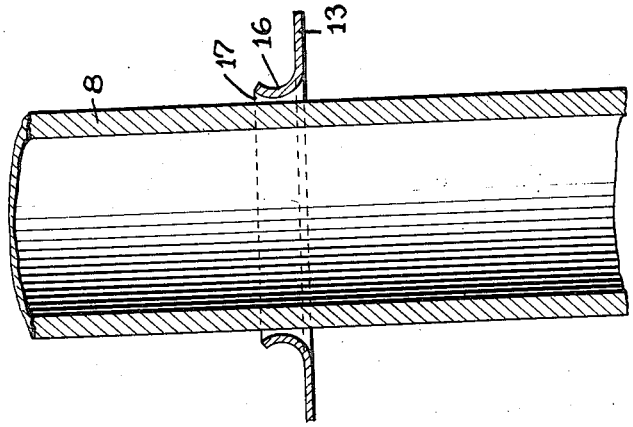
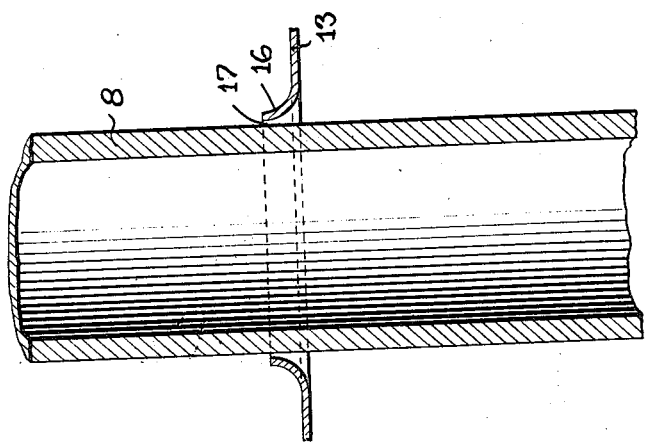
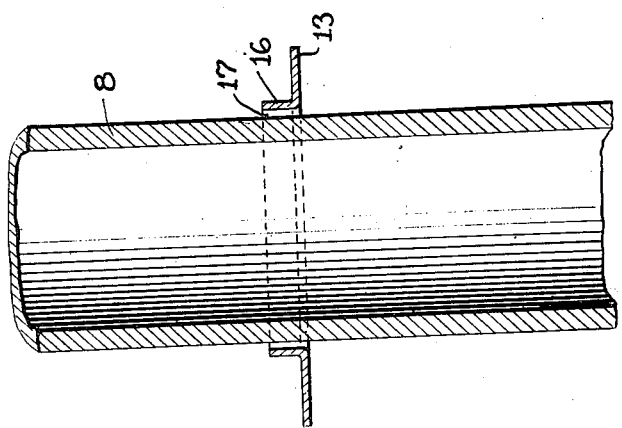

1,522,866

UNITED STATES PATENT OFFICE.

ROBERT COLSTON, OF LARCHMONT, NEW YORK, ASSIGNOR TO THE GRISCOM RUSSELL COMPANY, OF NEW YORK, N. Y., A CORPORATION OF DELAWARE.

OIL COOLER.

Application filed April 19, 1922. Serial No. 555,591.

*To all whom it may concern:*

Be it known that I, ROBERT COLSTON, a citizen of the United States, residing at 36 Wendt Avenue, Larchmont, in the county of Westchester, State of New York, have invented certain new and useful Improvements in Oil Coolers; and I do hereby declare the following to be a full, clear, and exact description of the invention, such as will enable others skilled in the art to which it appertains to make and use the same.

This invention relates to apparatus for effecting a heat interchange between two liquids, and has to do particularly with a heat interchange apparatus for oils or similar liquids whose viscosity changes with temperature, and in which apparatus a baffle element is employed for directing the flow of one of the heat interchanging liquids with relation to the tubes or passages carrying the other liquid. The invention is particularly applicable to the type of apparatus disclosed in the patent to R. C. Jones No. 1,335,506.

One of the objects of the present invention is to provide a cooler of the type above mentioned, in which the tubes containing the cooling liquid are scoured throughout their length, so that there will be no accumulation of congealed oil at any point on the tubes and the heat transferring surfaces of the tubes will be kept at their maximum efficiency.

The invention consists essentially of a peculiar construction of the baffles in the cooler, whereby the abovementioned result is obtained.

Oil coolers of the type described in the patent above referred to consist essentially of a shell with inlet and outlet passages for the oil to be cooled, the shell containing a series of longitudinal tubes through which the cooling medium is circulated. Supported within the shell are a series of baffle plates connected together to form a continuous helical passage from the inlet to the outlet passage of the shell, whereby in traversing the short length of the shell the oil is caused to pass again and again across the tubes containing the cooling liquid, thus providing in an apparatus of small dimensions a passage for the oil many times the length of the shell, whereby an effective cooling of the oil is obtained. The baffle plates are usually constructed of sheet iron, each stamped to constitute a single turn of the screw and perforated for the passage of the tubes which are set close together in the shell. The baffle element may, of course, assume other forms. For instance, the baffle may consist of a series of flat plates arranged one above the other in the shell in such relation as to cause the liquid to flow back and forth around the ends of the successive baffles interposed along the path of flow of the liquid. In this manner a tortuous path is provided for the liquid in its passage through the shell, and the entire volume of the liquid is accordingly brought into repeated contact with the heat transferring surfaces. When the tubes fit closely in the perforations of the plates there is a tendency of the oil to congeal in the corners at the intersections of the tubes and the baffle plates, particularly on the far side of the tubes in the direction of the flow of oil, the congealed oil gradually accumulating in the shape of a fillet which rendered a considerable portion of the tube surface ineffective for the transfer of heat from the oil to the liquid.

In the present invention this accumulation of congealed oil is prevented by so constructing the baffles that there is a clearance between them and the tubes, and the edges of the openings in the baffles through which the tubes pass are flanged so as to cause a film of oil passing through the clearance space to remain in contact with the surface of the tubes over an appreciable portion of their length. Since there must be a difference of pressure on the two sides of a baffle in order to force the oil through the cooler, some of the oil is forced through the small annular openings between the baffle and pipes, and this film of oil produces a scouring action which prevents the accumulation of congealed oil.

According to the present invention, the holes in the baffles may be punched somewhat smaller in diameter than the tubes, after which the excess metal may be flanged to form a collar or nozzle of any desired shape, the smallest diameter being slightly greater than that of the tubes.

An embodiment of the invention is illustrated in the accompanying drawings, in which—

Fig. 1 is a longitudinal sectional view of one form of my improved cooler;

Fig. 2 is a section on line 2—2 of Fig. 1;

Fig. 3 is a detailed view showing the baffle construction;

Figs. 4, 5 and 6 are detailed views showing some of the ways in which the flanges on the baffles may be shaped, and Figure 7 is a detailed view of a portion of the baffle.

Referring to the drawings, particularly Fig. 1, 1 indicates the shell of the apparatus which, as here shown, is tubular and is provided near one end with a flanged inlet 2 for the passage of oil, and at the opposite end with an oil outlet 3.

The cooling liquid is supplied through an inlet 9 in a header 5, and flows through a plurality of tubes 8 in the upper half of the shell to a header 7 in the opposite end of the shell. From this header the cooling liquid flows through the tubes 8 in the lower part of the shell. The tubes 8 are arranged in concentric circles around the rod or pipe 6, the tubes of the alternate rows being staggered as shown ore particularly in Figure 2. All of the tubes are expanded in a tube sheet 10, after the manner of boiler tubes, to produce rigid and fluid tight joints. At the other end of the shell, the tubes are closed in a floating head 11, the cylindrical wall of which is slidably mounted in the shell 1 to permit free expansion and contraction of the water tubes. This head 11 is closed by a cap 12 which is bolted thereto. A packing joint is provided around the head 11, which consists of a packing ring 12' clamped in place by means of a flanged ring 11' bolted to the flanged end of the shell.

The oil is caused to flow transversely to the tubes through the shell by a spiral baffle made up of separate plates 13, each bent to form a single helix of the spiral with the edges of the adjacent helices aligned with each other, and in some cases attached together by butt joints of usual design. Figure 7 illustrates one of these baffle sections having portions 18 at the ends of the section bent over for attachment to the adjacent baffles in the shell. The helices are of low pitch so as to provide a long narrow passage for the oil from the inlet to the outlet through which the oil may be forced with an appreciable velocity. The separate baffle plates 13 are preferably maintained in properly spaced relation by short sleeves or thimbles 14 mounted on rods 15 arranged around the periphery of the tubes 8 and abutting at their opposite ends against the tubes sheet 10 and floating head 11. The rod or tube 6 forms an axis for the helical baffles.

The apparatus so far described is the same as that disclosed in the Jones patent referred to above. In the present invention the baffle plates, instead of being plane and having perforations of the same size as the external diameter of the tubes, are provided with openings larger than the tubes and having flanged edges, where short annular passages are formed through the baffles and connecting each turn of the helix with the adjacent turns. In Figs. 4, 5 and 6, such a flanged edge 16 is shown on the baffle 13 forming, with the tube 8, an annular passage 17 through which a film of oil is forced. By this means a scouring action is produced on the tube along a considerable portion of its length in the vicinity of the flanged opening.

I have found that the use of the flange, as distinguished from a plane opening of the same size, increases the scouring action without a corresponding increase in the resistance to the flow of the fluid through the cooler. With a given shell and definite baffle pitch, the capacity of the apparatus is increased without a correspondingly great increase in the pressure drop. Also, for a given capacity and shell, it is possible to increase the baffle pitch, thereby decreasing the weight, the pressure drop, and the cost of manufacture. Furthermore, the stiffening effect of the flanged edges permits the use of lighter baffle stock and thereby increases the economy of manufacture.

The invention is not limited to any particular shape of flange. Three shapes are shown in Figs. 4, 5 and 6. That shown in Fig. 5 is designed to reduce the entrance friction of the liquid passing through the annular passage and to facilitate the manufacturing operation. The form shown in Fig. 6 approximates a Venturi throat and, therefore, has a very low friction drop.

It is obvious that the apparatus which constitutes the subject-matter of the present invention may be used in any case where it is desired to heat or cool liquid by transferring heat from one liquid to another, and the invention is therefore not limited in this respect. Particularly is it true that the invention is not limited in application to a spiral form of baffle, or in fact to any specific form. The invention is applicable to any apparatus of this general class in which baffle elements or equivalent parts are provided to direct the flow of liquid through the apparatus, the advantages resulting from the embodiment of my invention in an apparatus of this class being most pronounced when the liquid flowing over the baffle elements is of such character that its viscosity changes with temperature.

It is apparent that the size and shape of the parts may be varied without departing from the principle of the invention which is not confined to the particular embodiments shown and described, but is intended to cover such modifications thereof as fall within the scope of the appended claims.

I claim:

1. In an apparatus of the class described, the combination of a shell for the circulating liquid, tubes extending into said shell, baffles in said shell for causing a portion of said liquid to flow in a circuitous path, and means for causing a second portion of the liquid to flow along said tubes, said second portion being caused to flow in close contact with said tubes over a substantial portion of their length, 2. In an apparatus of the class described, the combination of a shell for the circulating liquid, tubes extending into said shell, and baffles supported in said shell constituting a continuous path of flow thru the apparatus for the major portion of said liquid, said baffles being provided with holes through which the tubes project, and flanges bordering said holes and forming collars around said tubes positioned in close proximity thereto to thereby film a portion of the liquid into close contact with the tube surfaces over a substantial portion of the tube length.

3. In an apparatus of the class described, the combination of a shell for the fluid to be treated, tubes extending through said shell for conveying a second fluid in heat transferring relation with said first mentioned fluid, and baffles in said shell arranged to provide a circuitous passage through the apparatus for the liquid being treated, said baffles being provided with holes through which the tubes project, flanges bordering said holes and forming collars around said tubes for causing a portion of said first named fluid to flow along said tubes over a substantial portion of their length, said collars projecting at only one side of the baffle and in the direction of flow of said fluid.

4. In an apparatus of the class described, the combination of a shell for the fluid to be treated, tubes extending through said shell for a second fluid, said shell having inlet and outlet openings, and baffles in said shell arranged to provide a circuitous passage from the inlet to the outlet opening, said baffles being provided with holes through which the tubes project, flanges bordering said holes and shaped to form converging passages around said tubes for producing cross currents in the fluid in directions different from the main current along the baffles, and maintaining said currents in contact with said tubes over a substantial portion of their length.

5. In an apparatus of the class described, the combination of a shell for the fluid to be treated, tubes extending through said shell for a second fluid, said shell having inlet and outlet openings and baffles in said shell arranged to provide a circuitous passage from the inlet to the outlet opening, said baffles being provided with holes through which the tubes project, flanges bordering said holes and shaped to form Venturi throats around said tubes for producing cross currents in the fluid in directions different from the main current along the baffles, and maintaining said currents in contact with said tubes over a substantial portion of their length.

6. In an apparatus of the class described, the combination of a shell for the circulating liquid, tubes extending into said shell, baffles in said shell forming a continuous path of flow thru the apparatus for the major portion of the liquid, said baffles being provided with holes thru which the tubes project and flanges bordering said holes consisting of a portion of the material of the baffle bent aside to constitute flanges surrounding the tubes in close proximity thereto to thereby film a portion of the liquid into close contact with the tube surface over a substantial portion of the length of said tubes.

In testimony whereof I affix my signature.

ROBERT COLSTON.